(12) United States Patent
Lai et al.

(10) Patent No.: US 12,512,282 B2
(45) Date of Patent: Dec. 30, 2025

(54) CEILING FAN DEVICE WITH WALL CONTROL-COMPATIBLE PULL CHAIN SWITCH

(71) Applicant: Idea DC Motor & LED Co., Ltd, Zhongshan (CN)

(72) Inventors: Yuanfeng Lai, Zhongshan (CN); Zibai Yu, Zhongshan (CN); Yuanzhong Lai, Zhongshan (CN); Qi Yu, Zhongshan (CN)

(73) Assignee: Idea DC Motor & LED Co., Ltd, Zhongshan (CN)

( * ) Notice: Subject to any disclaimer, the term of this patent is extended or adjusted under 35 U.S.C. 154(b) by 218 days.

(21) Appl. No.: 18/421,953

(22) Filed: Jan. 24, 2024

(65) Prior Publication Data

US 2025/0201498 A1 Jun. 19, 2025

(30) Foreign Application Priority Data

Dec. 15, 2023 (CN) .......................... 202311741072.7

(51) Int. Cl.
*H02G 3/12* (2006.01)
*H01H 17/16* (2006.01)
*F04D 25/06* (2006.01)
*F04D 25/08* (2006.01)

(52) U.S. Cl.
CPC ............. *H01H 17/16* (2013.01); *F04D 25/06* (2013.01); *F04D 25/088* (2013.01)

(58) Field of Classification Search
CPC ... H01H 17/16; H01H 2300/03; F04D 25/088
See application file for complete search history.

(56) References Cited

U.S. PATENT DOCUMENTS

2019/0264700 A1\* 8/2019 Huggins ............... F04D 27/002

\* cited by examiner

*Primary Examiner* — Muhammad S Islam
(74) *Attorney, Agent, or Firm* — Daylight Law, P.C.

(57) ABSTRACT

A ceiling fan device with a wall control-compatible pull chain switch is disclosed, including a wall control module group, a pull chain switch assembly, a sampling and control module group, a drive module, and a fan motor. The wall control module group includes an operating module and a signal modulation module. The operating module is configured to be connected to a live wire, the signal modulation module is connected to the operating module, and operation on the operating module enables the signal modulation module to output a first control command. Operation on the pull chain switch assembly enables a second control command to be output. The sampling and control module group is connected to the drive module to drive the fan motor to operate by means of the drive module according to at least one of the first control command and the second control command.

10 Claims, 6 Drawing Sheets

CEILING FAN DEVICE WITH WALL CONTROL-COMPATIBLE PULL CHAIN SWITCH

CROSS-REFERENCE TO RELATED APPLICATION

This application claims priority to Chinese Patent Application No. 2023117410727, filed on 15 Dec. 2023, the entirety of which is incorporated by reference herein for all purposes.

TECHNICAL FIELD

The present disclosure relates to the technical field of ceiling fans, and in particular to a ceiling fan device with a wall control-compatible pull chain switch.

BACKGROUND

The operation of a conventional ceiling fan with a pull chain switch can be controlled by a user by pulling the pull chain switch, but it is inevitably inconvenient to operate the ceiling fan only using the pull chain switch. Therefore, some manufacturers consider adding a wall control device to a ceiling fan device. However, adding the wall control device will results in a complex wiring and cause difficulty in arrangement.

SUMMARY

The present disclosure is intended to solve at least one of the technical problems in the existing technology. Therefore, the present disclosure proposes a ceiling fan device with a wall control-compatible pull chain switch, which has the advantages of simple wiring structure and stable and reliable control.

According to an embodiment of a first aspect of the present disclosure, a ceiling fan device with a wall control-compatible pull chain switch includes: a wall control module group, including an operating module and a signal modulation module, where the operating module is configured to be connected to a live wire, the signal modulation module is connected to the operating module, and operation on the operating module enables the signal modulation module to output a first control command; a pull chain switch assembly, where operation on the pull chain switch assembly enables a second control command to be output; a sampling and control module group, connected to an output end of the signal modulation module and the pull chain switch assembly respectively; a drive module and a fan motor, where the drive module is connected to the fan motor to form a drive branch, and the sampling and control module group is connected to the drive module to drive the fan motor to operate by means of the drive module according to at least one of the first control command or the second control command.

The ceiling fan device with a wall control-compatible pull chain switch according to embodiments of the present disclosure has at least the following beneficial effects.

According to the ceiling fan device of the present disclosure, a user operates the pull chain switch assembly to generate a second control command, and the sampling and control module group can control the drive module according to the second control command to drive the fan motor to operate. When the wall control module group is added, it is only necessary to connect the operating module to the live wire, and the user' operation on the operating module enables the signal modulation module to output a first control command. The sampling and control module group can also control the drive module according to the second control command to drive the fan motor to operate. Therefore, the wiring structure is simple, and control is stable and reliable.

According to some embodiments of the present disclosure, the sampling and control module group includes a sampling module and a control module. The sampling module is connected to an output end of the signal modulation module, the sampling module is configured to parse the first control command, and the control module is connected to the sampling module, the pull chain switch assembly, and the drive module, respectively.

According to some embodiments of the present disclosure, the operating module includes a half-bridge signal generation module. The signal modulation module is configured to encode the half-bridge signal generation module. The sampling module includes a half-bridge signal decoding module, which is configured to decode an encoded half-bridge signal.

According to some embodiments of the present disclosure, the half-bridge signal decoding module includes a first zero-crossing detection unit and a second zero-crossing detection unit. A positive terminal of a sampling end of the first zero-crossing detection unit is connected to the live wire, and a negative terminal of the sampling end of the first zero-crossing detection unit is connected to a neutral wire. A positive terminal of a sampling end of the second zero-crossing detection unit is connected to the neutral wire, and a negative terminal of the sampling end of the second zero-crossing detection unit is connected to the live wire. The control module is connected to an output end of the first zero-crossing detection unit and an output end of the second zero-crossing detection unit, respectively.

According to some embodiments of the present disclosure, the first zero-crossing detection unit includes a resistor R9, a resistor R10, a resistor R11, a capacitor C11, and a photoelectric coupler U8. One end of the resistor R11 is connected to the live wire, and the other end of the resistor R11 is connected to a positive terminal of a light emitter of the photoelectric coupler U8. A negative terminal of the light emitter of the photoelectric coupler U8 is connected to the neutral wire. One end of a light receiver of the photoelectric coupler U8 is connected to one end of the resistor R9 and one end of the resistor R10, respectively, the other end of the resistor R9 is connected to a power supply, and the other end of the resistor R10 is connected to one end of the capacitor C11 and the control module respectively. The other end of the light receiver of the photoelectric coupler U8 and the other end of the capacitor C11 are both grounded.

According to some embodiments of the present disclosure, the half-bridge signal generation module includes a first operating switch, a second operating switch, a first diode, and a second diode. The first operating switch and the first diode are connected in parallel to form at least part of a first parallel branch. The second operating switch and the second diode are connected in parallel to form at least part of a second parallel branch. One end of the first parallel branch is connected to the live wire, the other end of the first parallel branch is connected to one end of the second parallel branch, and the other end of the second parallel branch is connected to the signal modulation module. The first diode and the second diode are in opposite directions.

According to some embodiments of the present disclosure, the pull chain switch assembly includes a speed-regulating pull chain switch and a speed-regulating sampling unit. One end of the speed-regulating pull chain switch is connected to the power supply, and the other end of the speed-regulating pull chain switch is connected to the speed-regulating sampling unit. The speed-regulating sampling unit is connected to the control module.

According to some embodiments of the present disclosure, the pull chain switch assembly includes a forward-and-reverse-rotation pull chain switch and a forward-and-reverse-rotation sampling unit. One end of the forward-and-reverse-rotation pull chain switch is connected to the power supply, and the other end of the forward-and-reverse-rotation pull chain switch is connected to the forward-and-reverse-rotation sampling unit. The forward-and-reverse-rotation sampling unit is connected to the control module.

According to some embodiments of the present disclosure, the ceiling fan device with a wall control-compatible pull chain switch further includes: a temperature detection module, connected to the control module and configured to detect a working temperature of the fan motor.

According to some embodiments of the present disclosure, the ceiling fan device with a wall control-compatible pull chain switch further includes: a power supply drive module, where an input end of the power supply drive module is connected to the live wire and the neutral wire, respectively, and the power supply drive module is configured to modulate a supply voltage to supply power to the control module.

Additional aspects and advantages of the present disclosure will be partially set forth in the following description, and will partially become apparent from the following description or be understood through practice of the present disclosure.

BRIEF DESCRIPTION OF DRAWINGS

The above and/or additional aspects and advantages of the present disclosure will become apparent and easily understood from the description of embodiments in conjunction with the following accompanying drawings, in which.

Figure 1:
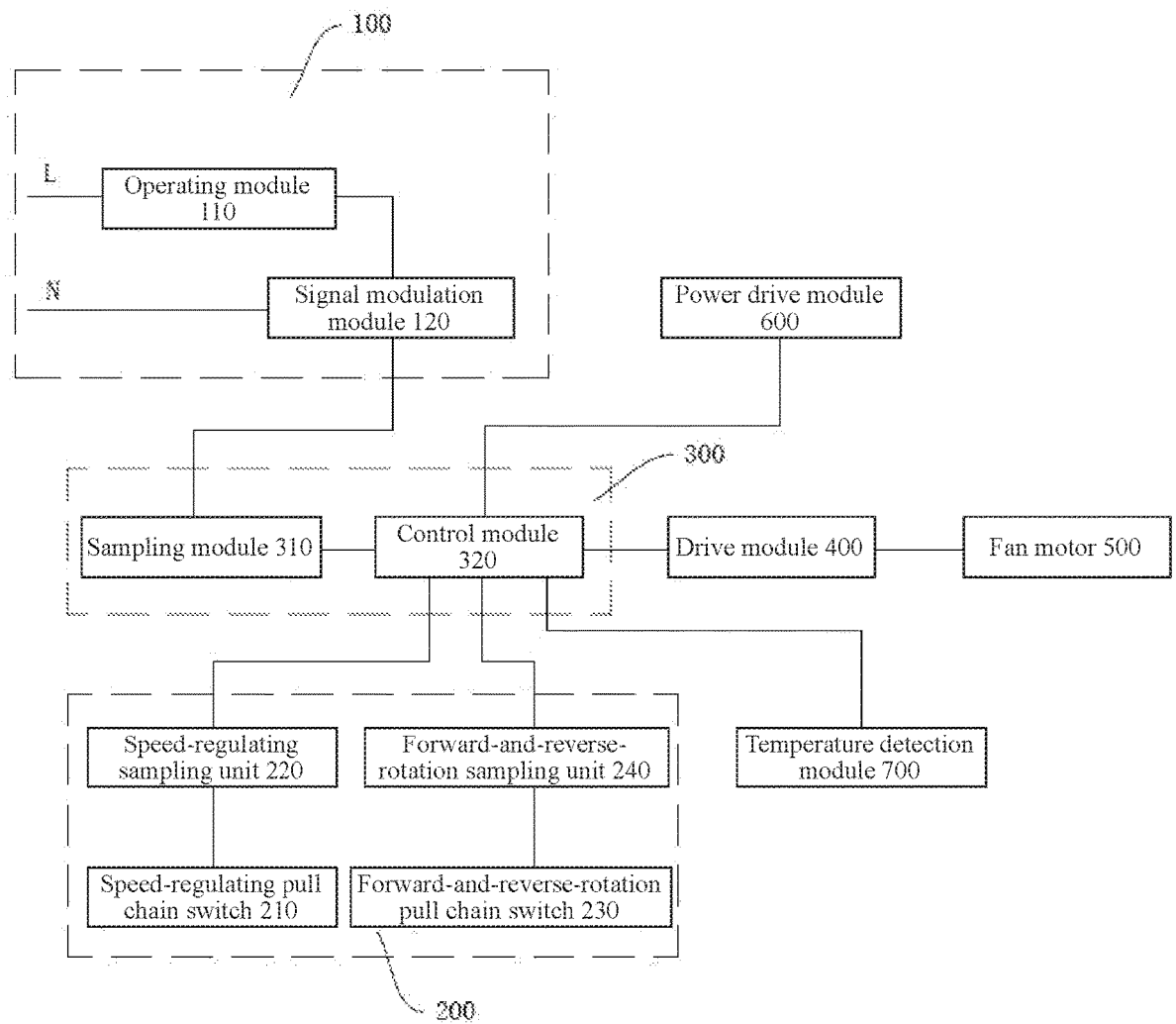
FIG. 1 is a schematic structural block diagram of a ceiling fan device according to an embodiment of the present disclosure.

Reference numerals: wall control module group 100; operating module 110; first operating switch 111; second operating switch 112; first diode 113; second diode 114; signal modulation module 120; pull chain switch assembly 200; speed-regulating pull chain switch 210; speed-regulating sampling unit 220; forward-and-reverse-rotation pull chain switch 230; forward-and-reverse-rotation sampling unit 240; sampling and control module group 300; sampling module 310; first zero-crossing detection unit 311; second zero-crossing detection unit 312; control module 320; drive module 400; fan motor 500; power supply drive module 600; and temperature detection module 700.

DETAILED DESCRIPTION

The embodiments of the present disclosure are described in detail below, and the examples of the embodiments are shown in the accompanying drawings, throughout which like reference numerals represent like elements or elements having the same or similar functions. The embodiments described below with reference to the accompanying drawings are exemplary and are merely intended to illustrate the present disclosure and are not to be construed as limiting the present disclosure.

In the description of the present disclosure, it should be understood that orientation descriptions involved, e.g., orientations or positional relationships indicated by terms such as "upper", "lower", "front", "rear", "left", "right", "vertical", "horizontal", "top", "bottom", "inner", "outer" and the like, are based on the orientations or positional relationships shown in the accompanying drawings. These relative terms are for convenience and simplification of description of the present disclosure, but do not require that the present disclosure should be constructed or operated in a particular orientation, and therefore cannot be construed to limit the present disclosure.

In the description of the present disclosure, "a plurality of" means one or more, while "multiple" means two or more. "Greater than", "less than", "exceed" and the like should be understood as excluding the following number, while "more than", "less than", "within" and the like should be understood as including the following number. If described, "first", "second" and the like are merely used to distinguish technical features and are not intended to indicate or imply relative importance or to implicitly indicate the number of indicated technical features or to implicitly indicate a precedence relationship of the indicated technical features.

In the description of the present disclosure, it should be noted that unless clearly specified and defined otherwise, the terms "mounted", "connected" and "coupled" and the like are used broadly, and may be, for example, fixed connections, detachable connections, or integral connections; may also be mechanical connections, or electric connections; may also be direct connections, or indirect connections via intervening structures; may also be inner communications of two elements. The specific meaning of the above terms within the present disclosure may be understood by those having ordinary skills in the art according to particular circumstances.

As shown in FIGS. 1 to 9, a ceiling fan device with a wall control-compatible pull chain switch according to an embodiment of a first aspect of the present disclosure includes a wall control module group 100, a pull chain switch assembly 200, a sampling and control module group 300, a drive module 400, and a fan motor 500. The wall control module group 100 includes an operating module 110 and a signal modulation module 120. The operating module 110 is configured to be connected to a live wire, the signal modulation module 120 is connected to the operating module 110, and operation on the operating module 110 enables the signal modulation module 120 to output a first control command. A second control command can be output by operating the pull chain switch assembly 200. The sampling and control module group 300 is connected to an output end of the signal modulation module 120, and the pull chain switch assembly 200, respectively. The drive module 400 is connected to the fan motor 500 to form a drive branch. The sampling and control module group 300 is connected to the drive module 400 to drive the fan motor 500 to operate by means of the drive module 400 according to at least one of the first control command or the second control command.

Figure 2:
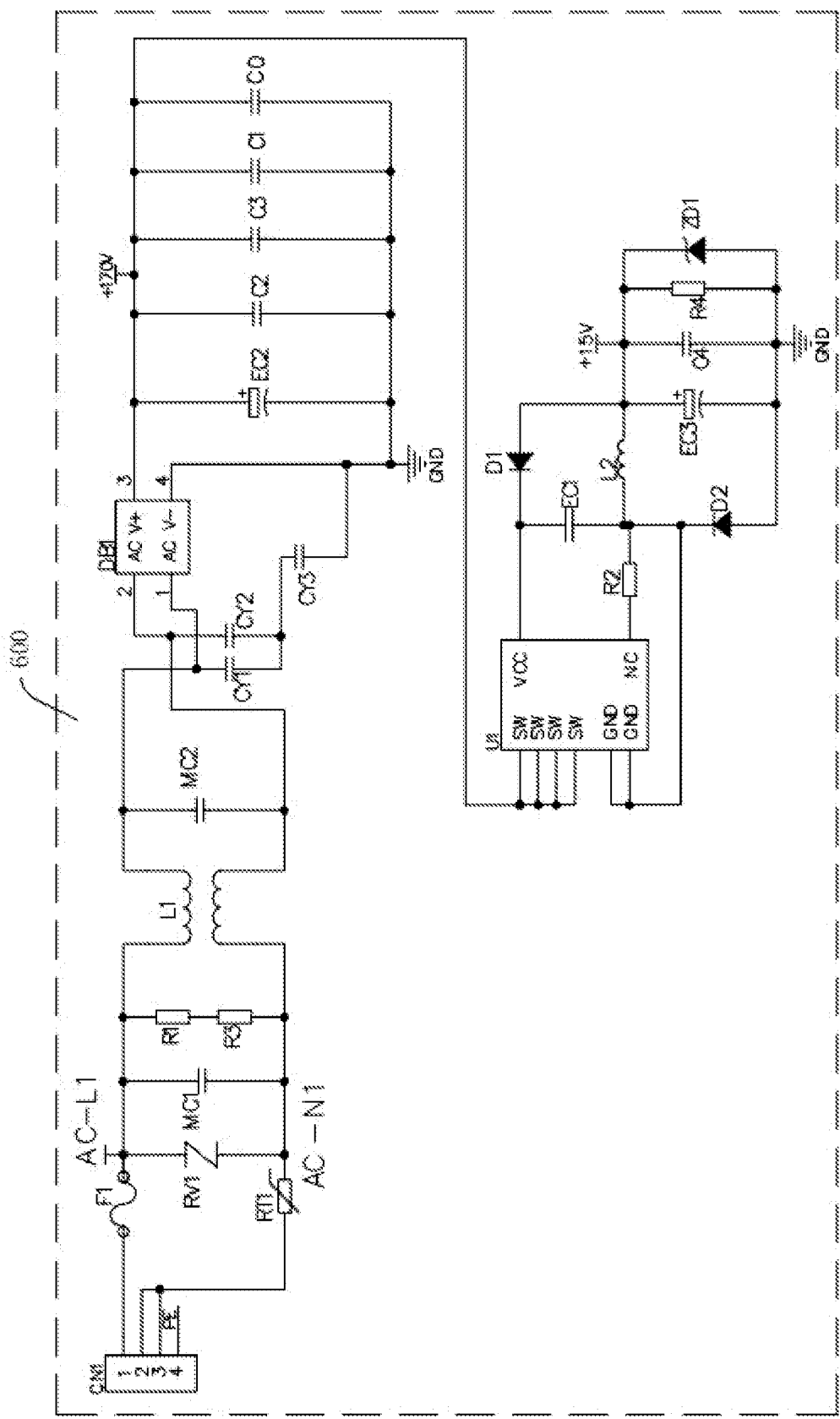
FIG. 2 is a schematic circuit diagram of a power supply drive module.

In some embodiments of the present disclosure, as shown in FIG. 2, the ceiling fan device further includes a power supply drive module 600. An input end of the power supply drive module 600 is connected to the live wire and a neutral wire, respectively and the power supply drive module 600 modulates a supply voltage to supply power to the control module 320.

The power supply drive module 600 includes a rectifier unit and a voltage regulator unit. The rectifier unit may be selected from conventional rectifier bridges, and the voltage regulator unit may be selected from conventional voltage regulator chips and accessory circuits thereof.

The wall control module group 100 may include an operating box which may be installed in a cavity. The operating module 110 is arranged in the operating box and connected to the live wire. The power supply drive module 600, the sampling and control module group 300 and the drive module 400 are located near the fan motor 500. The first control command output by the signal modulation module 120 may be superposed in electric energy transmitted by the live wire through a carrier pattern, it is connected to the sampling and control module group 300 through the extension of the live wire, and the live wire is also connected to the power supply drive module 600. The power supply drive module 600 modulates a supply voltage to supply power to the sampling and control module group 300. Moreover, the live wire and the neutral wire will also be connected to the drive module 400 to supply power to the fan motor 500.

Figure 8:
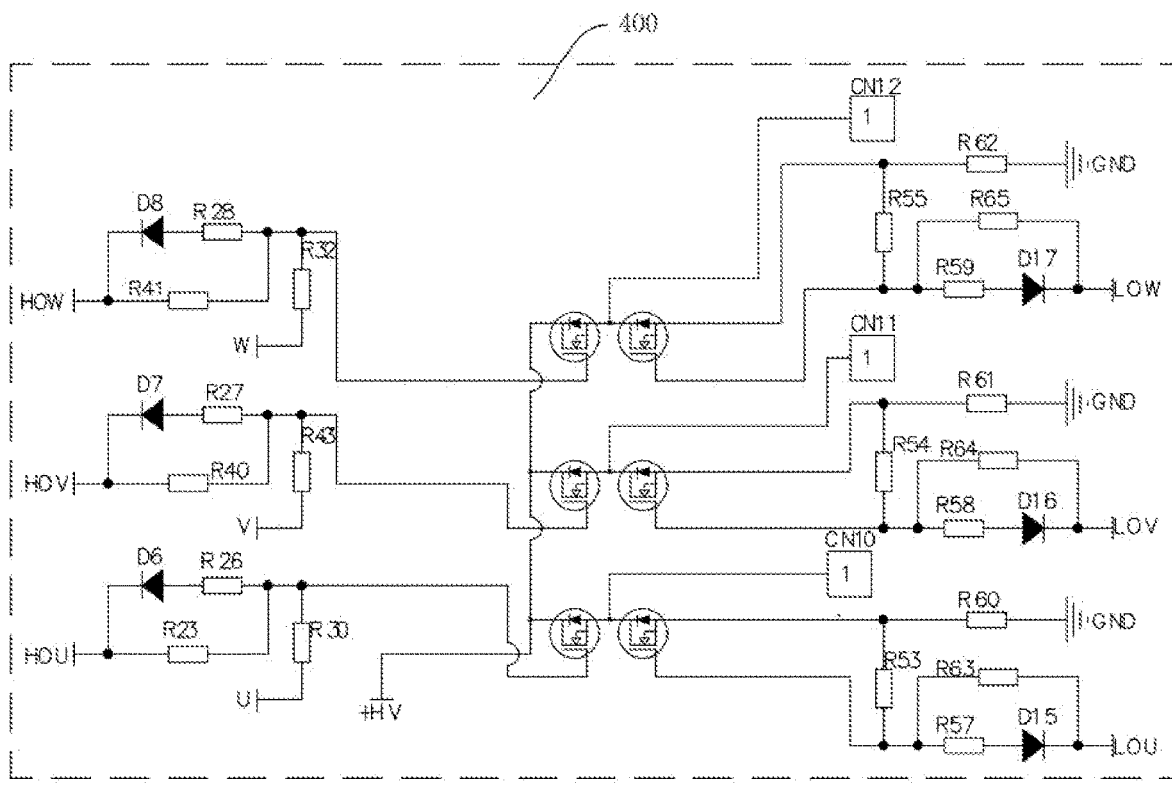
FIG. 8 is a schematic circuit diagram of a drive module.

The fan motor 500 may be selected from conventional motors for driving fan blades to rotate. As shown in FIG. 8, the drive module 400 may be composed of a plurality of semiconductor switching transistors, and the sampling and control module group 300 modulates different Pulse-Width Modulation (PWM) signals for each switching transistor, so as to drive the fan motor 500 to perform forward rotation, reverse rotation and speed-regulated operations.

According to the ceiling fan device of the present disclosure, when a user operates the pull chain switch assembly 200 to generate the second control command, the sampling and control module group 300 can control the drive module 400 according to the second control command, so as to drive the fan motor 500 to operate. When the wall control module group 100 is added, only the operating module 110 needs to be connected to the live wire, and operation on the operating module 110 by the user enables the signal modulation module 120 to output the first control command. The sampling and control module group 300 can also control the drive module 400 according to the second control command to drive the fan motor 500 to operate. Therefore, the wiring structure is simple, and control is stable and reliable.

Figure 3:
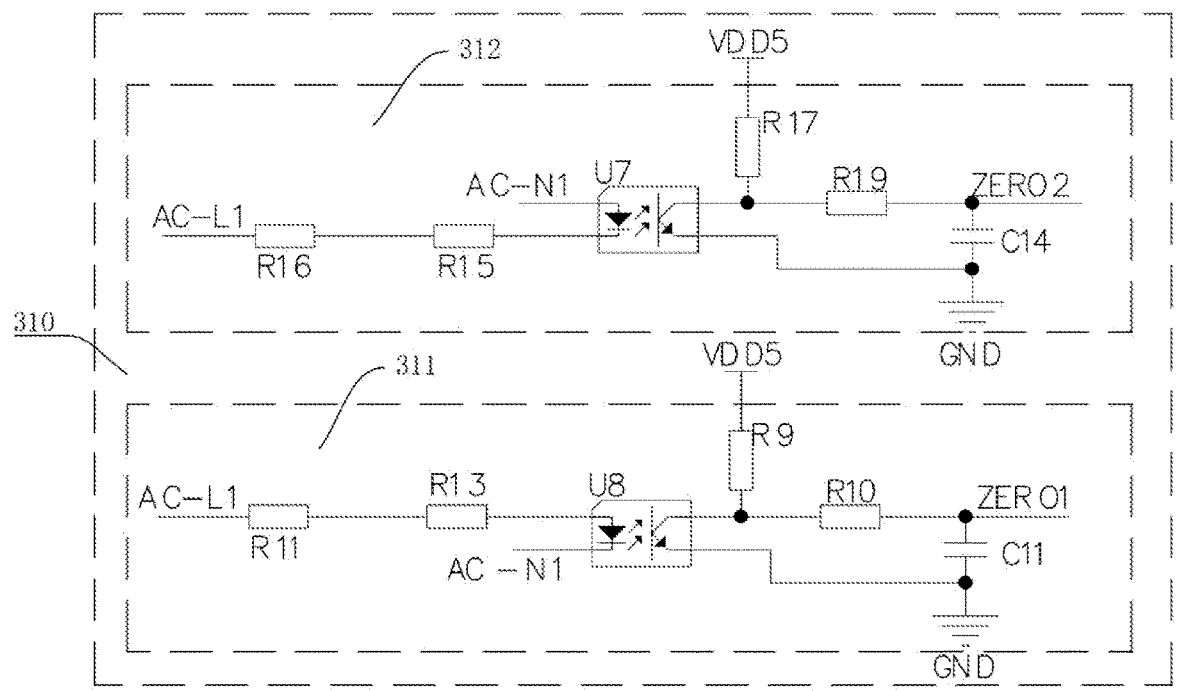
FIG. 3 is a schematic circuit diagram of a sampling module.
Figure 4:
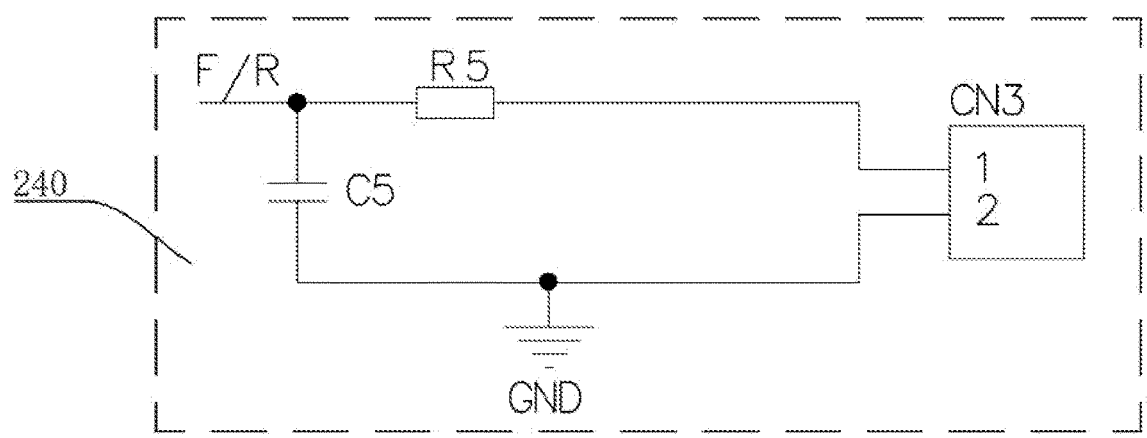
FIG. 4 is a schematic circuit diagram of a forward-and-reverse-rotation sampling unit.
Figure 6:
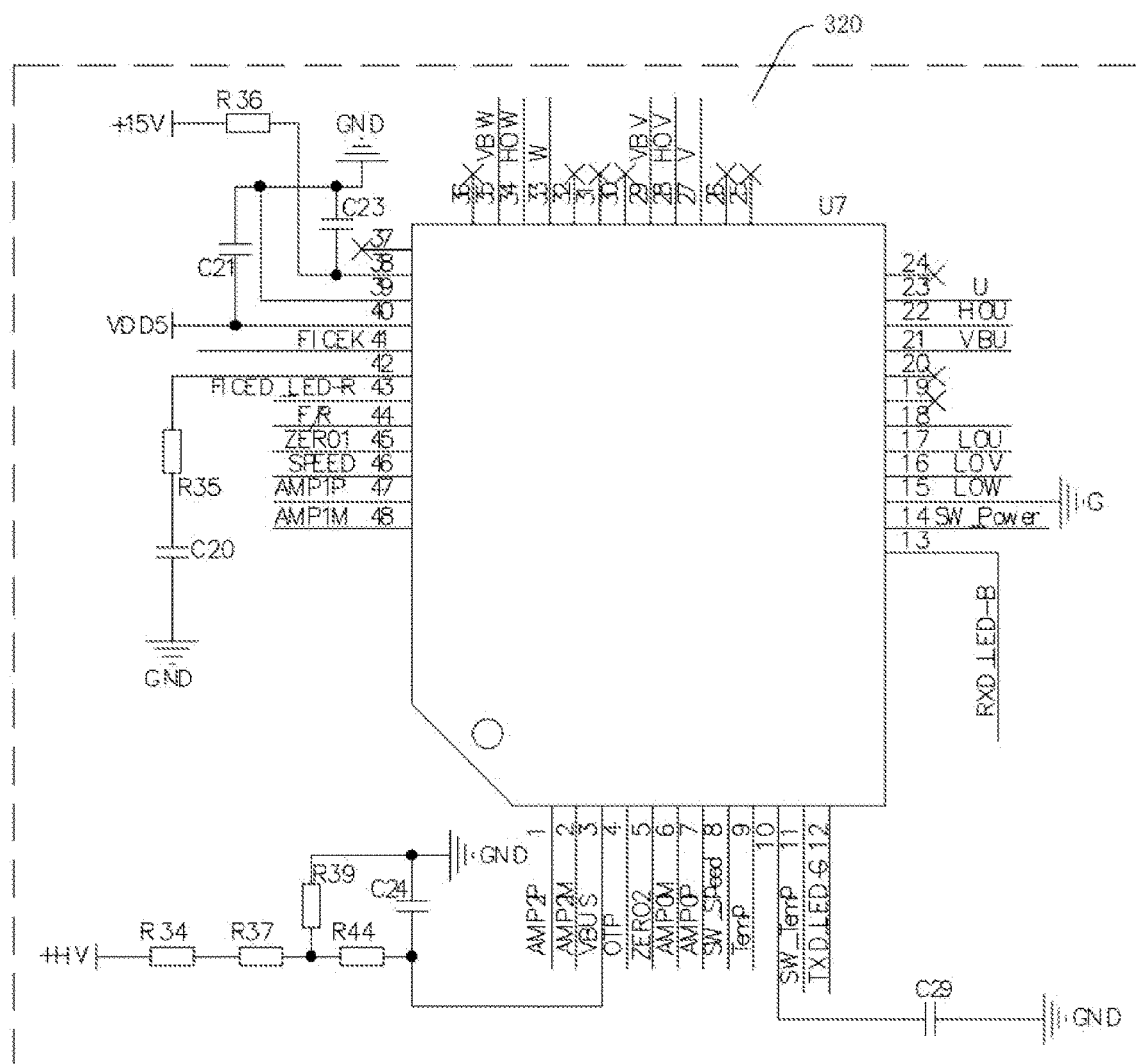
FIG. 6 is a schematic circuit diagram of a control module.
Figure 7:
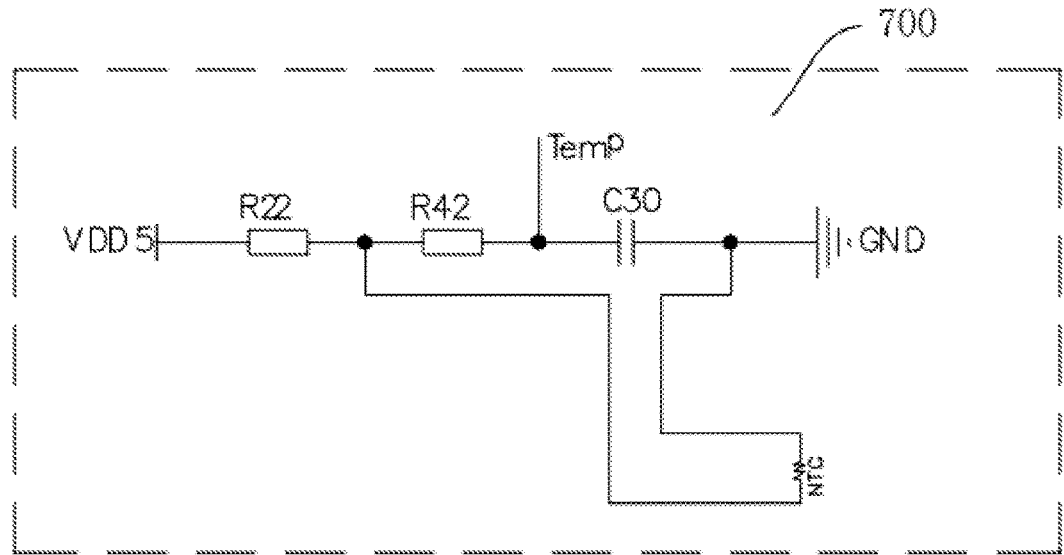
FIG. 7 is a schematic circuit diagram of a temperature detection module.

In some embodiments of the present disclosure, as shown in FIGS. 1, 3 and 6, the sampling and control module group 300 includes a sampling module 310 and a control module 320. The sampling module 310 is connected to the output end of the signal modulation module 120, and is configured to parse the first control command. The control module 320 is connected to the sampling module 310, the pull chain switch assembly 200, and the drive module 400, respectively.

The control module 320 may be selected from a Microprogrammed Control Unit (MCU), a CPU or other processors and accessory circuits thereof. The sampling module 310 can obtain a signal characterizing the first control command from the electric energy transmitted by the live wire and then parse out the first control command. The control module 320 then controls the drive module 400 to operate according to the first control command.

In some embodiments of the present disclosure, as shown in FIG. 1, the operating module 110 includes a half-bridge signal generation module. The signal modulation module 120 is configured to encode the half-bridge signal generation module, and the sampling module 310 includes a half-bridge signal decoding module, which is configured to decode an encoded half-bridge signal.

By only connecting the operating module 110 of this design to the live wire, a half-bridge signal can be made from the first control command and superimposed into the electric energy signal for transmission on the single live wire without adding other wiring. Therefore, the structure is simple, and control is reliable.

In some embodiments of the present disclosure, as shown in FIG. 3, the half-bridge signal decoding module includes a first zero-crossing detection unit 311 and a second zero-crossing detection unit 312. A positive terminal of a sampling end of the first zero-crossing detection unit 311 is connected to the live wire, and a negative terminal of the sampling end of the first zero-crossing detection unit 311 is connected to the neutral wire. A positive terminal of a sampling end of the second zero-crossing detection unit 312 is connected to the neutral wire, and a negative terminal of the sampling end of the second zero-crossing detection unit 312 is connected to the live wire. The control module 320 is connected to an output end of the first zero-crossing detection unit 311 and an output end of the second zero-crossing detection unit 312, respectively.

The first zero-crossing detection unit 311 can output a forward voltage when an alternating current between the live wire and the neutral wire is in a positive half cycle, and the second zero-crossing detection unit 312 can output a forward voltage when the alternating current between the live wire and the neutral wire is in a negative half cycle. Therefore, the control module 320 can obtain the first control command through parsing and then control the drive module 400 to operate.

In an embodiment, as shown in FIG. 3, the first zero-crossing detection unit 311 includes a resistor R9, a resistor R10, a resistor R11, a capacitor C11, and a photoelectric coupler U8. One end of the resistor R11 is connected to the live wire, and the other end of the resistor R11 is connected to a positive terminal of a light emitter of the photoelectric coupler U8. A negative terminal of the light emitter of the photoelectric coupler U8 is connected to the neural wire. One end of a light receiver of the photoelectric coupler U8 is connected to one end of the resistor R9 and one end of the resistor R10, respectively. The other end of the resistor R9 is connected to a power supply, and the other end of the resistor R10 is connected to one end of the capacitor C11 and, the control module 320, respectively. The other end of the light receiver of the photoelectric coupler U8 and the other end of the capacitor C11 are both grounded.

Likewise, the second zero-crossing detection unit 312 includes a resistor R17, a resistor R19, a resistor R16, a capacitor C14, and a photoelectric coupler U7. One end of the resistor R16 is connected to the live wire, and the other end of the resistor R16 is connected to the negative terminal of the light emitter of the photoelectric coupler U8. The positive terminal of the light emitter of the photoelectric coupler U8 is connected to the neural wire. One end of the light receiver of the photoelectric coupler U8 is connected to one end of the resistor R17 and one end of the resistor R19, respectively. The other end of the resistor R17 is connected to the power supply, and the other end of the resistor R19 is connected to one end of the capacitor C14 and the control module 320, respectively. The other end of the light receiver of the photoelectric coupler U8 and the other end of the capacitor C14 are both grounded.

Figure 9:
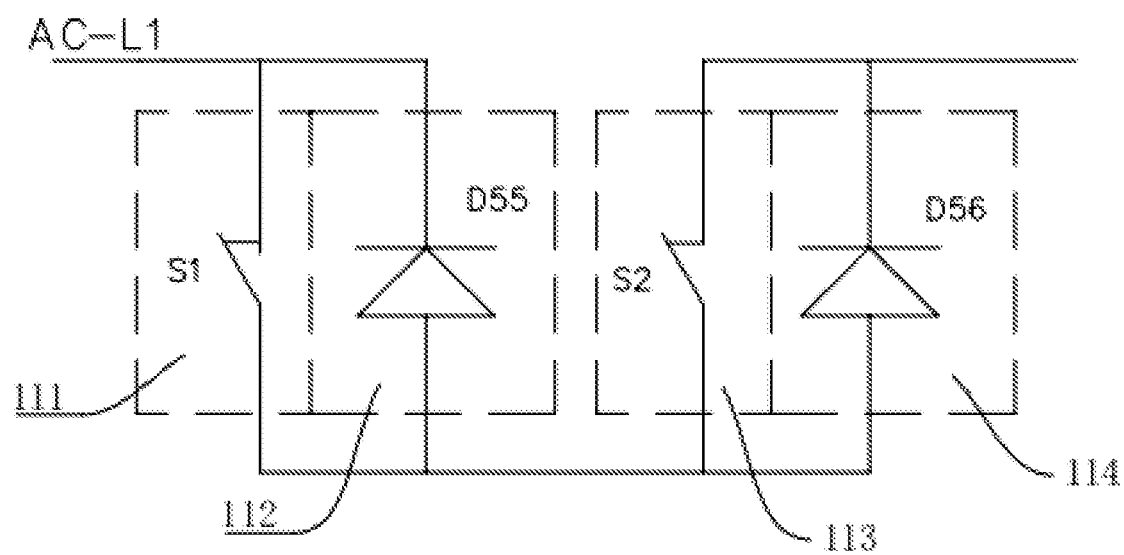
FIG. 9 is a schematic circuit diagram of a half-bridge signal generation module.

In some embodiments of the present disclosure, as shown in FIG. 9, the half-bridge signal generation module includes a first operating switch 111, a second operating switch 112, a first diode 113, and a second diode 114. The first operating switch 111 and the first diode 113 are connected in parallel to form at least part of a first parallel branch. The second operating switch 112 and the second diode 114 are connected in parallel to form at least part of a second parallel branch. One end of the first parallel branch is connected to the live wire, and the other end of the first parallel branch is connected to one end of the second parallel branch. The other end of the second parallel branch is connected to the signal modulation module 120. The first diode 113 and the second diode 114 are in opposite directions.

In an embodiment, a negative terminal of the first diode 113 is connected to the live wire, a positive terminal of the first diode 113 is connected to a positive terminal of the second diode 114, and a negative terminal of the second diode 114 is connected to the signal modulation module 120.

When both the first operating switch 111 and the second operating switch 112 are opened, current cannot pass through the half-bridge signal generation module. When the first operating switch 111 is closed and the second operating switch 112 is opened, the current in the positive half cycle can pass through the half-bridge signal generation module, while the current in the negative half cycle cannot pass through the half-bridge signal generation module. When the first operating switch 111 is opened and the second operating switch 112 is closed, the current in the positive half cycle cannot pass through the half-bridge signal generation module, while the current in the negative half cycle can pass through the half-bridge signal generation module. When both the first operating switch 111 and the second operating switch 112 are closed, both the current in the positive half cycle and the current in the negative half cycle can pass through the half-bridge signal generation module. The control module 320 determines the demand of the first control command according to different signals obtained, and accordingly controls the forward rotation, reverse rotation, or speed regulation of the fan motor 500.

Figure 5:
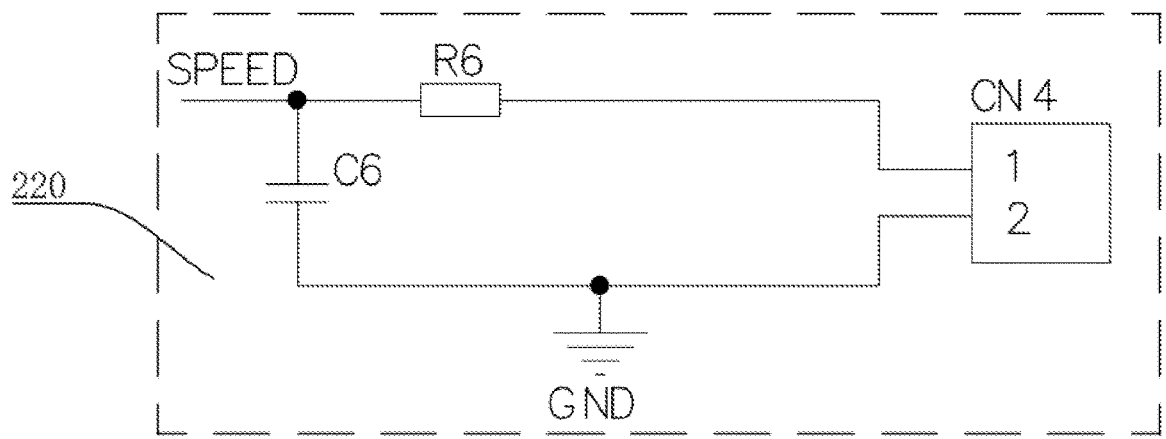
FIG. 5 is a schematic circuit diagram of a speed-regulating sampling unit.

In some embodiments of the present disclosure, as shown in FIGS. 1 and 5, the pull chain switch assembly 200 includes a speed-regulating pull chain switch 210 and a speed-regulating sampling unit 220. One end of the speed-regulating pull chain switch 210 is connected to the power supply, and the other end of the speed-regulating pull chain switch 210 is connected to the speed-regulating sampling unit 220. The speed-regulating sampling unit 220 is connected to the control module 320.

The speed-regulating pull chain switch 210 may be a potentiometer driven by a pull chain. The user controls the potentiometer to generate different resistance values by using the pull chain. The speed-regulating sampling unit 220 obtains a current signal generated by the speed-regulating pull chain switch 210, and then generates and provides a second control command to the control module 320.

In some embodiments of the present disclosure, as shown in FIGS. 1 and 5, the pull chain switch assembly 200 includes a forward-and-reverse-rotation pull chain switch 230 and a forward-and-reverse-rotation sampling unit 240. One end of the forward-and-reverse-rotation pull chain switch 230 is connected to the power supply, and the other end of the forward-and-reverse-rotation pull chain switch 230 is connected to the forward-and-reverse-rotation sampling unit 240. The forward-and-reverse-rotation sampling unit 240 is connected to the control module 320.

The forward-and-reverse-rotation pull chain switch 230 may be a switch driven by a pull chain. The user can control the on/off of the switch using the pull chain. The forward-and-reverse-rotation sampling unit 240 obtains a voltage signal generated by the switch, and then generates and provides a second control command to the control module 320.

According to some embodiments of the present disclosure, the ceiling fan device with a wall control-compatible pull chain switch further includes a temperature detection module 700. The temperature detection module 700 is connected to the control module 320 and is configured to detect a working temperature of the fan motor 500. A Negative Temperature Coefficient (NTC) thermistor may be selected as the temperature detection module 700, and the control module 320 can reasonably control the operation of the fan motor 500 according to the working temperature.

All the technical features of the above embodiments can be combined arbitrarily. In order to make the description concise, not all possible combinations of the technical features in the above embodiments are described. However, these technical features should be considered to be within the scope recorded in the present disclosure if there is no conflict in the combinations of these technical features.

Although the embodiments of the present disclosure have been illustrated and described, it can be understood by those having ordinary skills in the art that various changes, modifications, replacements and variations can be made to these embodiments without departing from the principle and purpose of the present disclosure, and the scope of the present disclosure is defined by the claims and equivalents thereof.

What is claimed is:

1. A ceiling fan device with a wall control-compatible pull chain switch, comprising:
   a wall control module group, comprising an operating module and a signal modulation module, wherein the operating module is configured to be connected to a live wire, the signal modulation module is connected to the operating module, and operation on the operating module enables the signal modulation module to output a first control command;
   a pull chain switch assembly, wherein operation on the pull chain switch assembly enables a second control command to be output;
   a sampling and control module group, connected to an output end of the signal modulation module and the pull chain switch assembly respectively;
   a drive module and a fan motor, wherein the drive module is connected to the fan motor to form a drive branch, and the sampling and control module group is connected to the drive module to drive the fan motor to operate by means of the drive module according to at least one of the first control command or the second control command.

2. The ceiling fan device with a wall control-compatible pull chain switch of claim 1, wherein the sampling and control module group comprises a sampling module and a control module, the sampling module is connected to the output end of the signal modulation module and is configured to parse the first control command, and the control module is connected to the sampling module, the pull chain switch assembly, and the drive module, respectively.

3. The ceiling fan device with a wall control-compatible pull chain switch of claim 2, wherein the operating module comprises a half-bridge signal generation module, the signal modulation module is configured to encode the half-bridge signal generation module, and the sampling module comprises a half-bridge signal decoding module configured to decode an encoded half-bridge signal.

4. The ceiling fan device with a wall control-compatible pull chain switch of claim 3, wherein the half-bridge signal decoding module comprises a first zero-crossing detection unit and a second zero-crossing detection unit, a positive terminal of a sampling end of the first zero-crossing detection unit is connected to the live wire, and a negative terminal of the sampling end of the first zero-crossing detection unit is connected to a neutral wire; a positive terminal of a sampling end of the second zero-crossing detection unit is connected to the neutral wire, and a negative terminal of the sampling end of the second zero-crossing detection unit is connected to the live wire; and the control module is connected to an output end of the first zero-crossing detection unit and an output end of the second zero-crossing detection unit, respectively.

5. The ceiling fan device with a wall control-compatible pull chain switch of claim 4, wherein the first zero-crossing detection unit comprises a resistor R9, a resistor R10, a resistor R11, a capacitor C11, and a photoelectric coupler U8, one end of the resistor R11 is connected to the live wire, and the other end of the resistor R11 is connected to a positive terminal of a light emitter of the photoelectric coupler U8; a negative terminal of the light emitter of the photoelectric coupler U8 is connected to the neutral wire; one end of a light receiver of the photoelectric coupler U8 is connected to one end of the resistor R9 and one end of the resistor R10, respectively; the other end of the resistor R9 is connected to a power supply; the other end of the resistor R10 is connected to one end of the capacitor C11 and the control module, respectively; and the other end of the light receiver of the photoelectric coupler U8 and the other end of the capacitor C11 are both grounded.

6. The ceiling fan device with a wall control-compatible pull chain switch of claim 3, wherein the half-bridge signal generation module comprises a first operating switch, a second operating switch, a first diode, and a second diode, the first operating switch and the first diode are connected in parallel to form at least part of a first parallel branch; the second operating switch and the second diode are connected in parallel to form at least part of a second parallel branch; one end of the first parallel branch is connected to the live wire, and the other end of the first parallel branch is connected to one end of the second parallel branch; the other end of the second parallel branch is connected to the signal modulation module; and the first diode and the second diode are in opposite directions.

7. The ceiling fan device with a wall control-compatible pull chain switch of claim 2, wherein the pull chain switch assembly comprises a speed-regulating pull chain switch and a speed-regulating sampling unit, one end of the speed-regulating pull chain switch is connected to the power supply, the other end of the speed-regulating pull chain switch is connected to the speed-regulating sampling unit, and the speed-regulating sampling unit is connected to the control module.

8. The ceiling fan device with a wall control-compatible pull chain switch of claim 2, wherein the pull chain switch assembly comprises a forward-and-reverse-rotation pull chain switch and a forward-and-reverse-rotation sampling unit, one end of the forward-and-reverse-rotation pull chain switch is connected to the power supply, the other end of the forward-and-reverse-rotation pull chain switch is connected to the forward-and-reverse-rotation sampling unit, and the forward-and-reverse-rotation sampling unit is connected to the control module.

9. The ceiling fan device with a wall control-compatible pull chain switch of claim 2, further comprising a temperature detection module connected to the control module, and configured to detect a working temperature of the fan motor.

10. The ceiling fan device with a wall control-compatible pull chain switch of claim 2, further comprising a power supply drive module, wherein an input end of the power supply drive module is connected to the live wire and the neutral wire respectively, and the power supply drive module is configured to modulate a supply voltage to supply power to the control module.

* * * * *